(12) United States Patent
Nakano et al.

(10) Patent No.: US 12,007,520 B2
(45) Date of Patent: Jun. 11, 2024

(54) ELECTROSTATIC TRANSDUCER AND ELECTROSTATIC TRANSDUCER UNIT

(71) Applicant: Sumitomo Riko Company Limited, Aichi (JP)

(72) Inventors: Katsuhiko Nakano, Aichi (JP); Shinya Tahara, Aichi (JP); Masaki Nasu, Aichi (JP)

(73) Assignee: Sumitomo Riko Company Limited, Aichi (JP)

(*) Notice: Subject to any disclaimer, the term of this patent is extended or adjusted under 35 U.S.C. 154(b) by 250 days.

(21) Appl. No.: 17/368,846

(22) Filed: Jul. 7, 2021

(65) Prior Publication Data

US 2021/0331203 A1 Oct. 28, 2021

Related U.S. Application Data

(63) Continuation of application No. PCT/JP2020/014158, filed on Mar. 27, 2020.

(30) Foreign Application Priority Data

Mar. 28, 2019 (JP) ................. 2019-063144

(51) Int. Cl.
*G01V 3/08* (2006.01)
*B06B 1/02* (2006.01)
(Continued)

(52) U.S. Cl.
CPC ............ *G01V 3/088* (2013.01); *B06B 1/0292* (2013.01); *B60R 21/01552* (2014.10); *G01D 5/241* (2013.01); *H04R 19/00* (2013.01)

(58) Field of Classification Search
CPC ............... G01V 3/088; B06B 1/0292; B60R 21/01552; G01D 5/241; H04R 19/00; H04R 19/02; H04R 19/04
See application file for complete search history.

(56) References Cited

U.S. PATENT DOCUMENTS 8,542,851 B2 * 9/2013 Kasai .................. H04R 19/005
381/175
2007/0154036 A1 * 7/2007 Matsuzawa ............ H04R 1/403
381/116
(Continued)

FOREIGN PATENT DOCUMENTS

CN 203933934 U * 11/2014 ............... H04R 7/06
CN 106339141 1/2017
(Continued)

OTHER PUBLICATIONS

"Written Opinion of the International Searching Authority (Form PCT/ISA/237) of PCT/JP2020/014158," dated Jun. 23, 2020, with English translation thereof, pp. 1-15.
(Continued)

*Primary Examiner* — Angelica M McKinney
(74) *Attorney, Agent, or Firm* — JCIPRNET

(57) ABSTRACT

Provided is an electrostatic transducer capable of reducing thickness and enhancing detection precision or operation precision. An electrostatic transducer (1) includes an insulating sheet (11), a first electrode sheet (12) arranged on the front surface side of the insulating sheet (11) and having a plurality of first through holes (12a) penetrating in a thickness direction, and a second electrode sheet (13) arranged on the back surface side of the insulating sheet (11) and having no through holes in the thickness direction or having a plurality of second through holes (13a) which have a smaller aperture ratio than the plurality of first through holes (12a).

26 Claims, 8 Drawing Sheets

(51) Int. Cl.
  *B60R 21/015*   (2006.01)
  *G01D 5/241*    (2006.01)
  *H04R 19/00*    (2006.01)

(56) References Cited

U.S. PATENT DOCUMENTS

| | | | |
|---|---|---|---|
| 2007/0195976 A1* | 8/2007 | Sekino | H04R 19/013 |
| | | | 381/191 |
| 2012/0319001 A1* | 12/2012 | Tsunoda | H01J 37/12 |
| | | | 250/396 R |
| 2014/0003634 A1* | 1/2014 | Ito | C08L 101/10 |
| | | | 381/190 |
| 2015/0104048 A1 | 4/2015 | Uchida et al. | |
| 2015/0369633 A1 | 12/2015 | Karasawa et al. | |
| 2016/0182989 A1* | 6/2016 | Kim | H04R 19/00 |
| | | | 381/163 |
| 2017/0010713 A1* | 1/2017 | Shinoda | G01D 5/2417 |
| 2020/0053482 A1 | 2/2020 | Nakano et al. | |
| 2020/0213772 A1 | 7/2020 | Hasegawa et al. | |
| 2020/0307992 A1 | 10/2020 | Hasegawa et al. | |
| 2021/0280888 A1* | 9/2021 | Yoshikawa | H01M 8/16 |

FOREIGN PATENT DOCUMENTS

| | | | | |
|---|---|---|---|---|
| CN | 108463700 A  * | 8/2018 | | B06B 1/06 |
| JP | H05172839 | 7/1993 | | |
| JP | 2008243581 | 10/2008 | | |
| JP | 2014027756 | 2/2014 | | |
| JP | 2014190856 | 10/2014 | | |
| WO | 2013179990 | 12/2013 | | |
| WO | 2014123222 | 8/2014 | | |
| WO | 2018181641 | 10/2018 | | |
| WO | WO-2018181641 A1 * | 10/2018 | | B06B 1/06 |

OTHER PUBLICATIONS

"International Search Report (Form PCT/ISA/210) of PCT/JP2020/014158," dated Jun. 23, 2020, with English translation thereof, pp. 1-4.

"Search Report of Europe Counterpart Application", dated May 26, 2021, pp. 1-7.

Office Action of China Counterpart Application, with English translation thereof, dated Apr. 15, 2023, pp. 1-21.

"Office Action of Europe Counterpart Application", dated Jul. 26, 2023, p. 1-p. 4.

"Office Action of China Counterpart Application", dated Oct. 12, 2023, with English translation thereof, pp. 1-11.

"Office Action of Japan Counterpart Application", issued on Mar. 5, 2024, with English translation thereof, pp. 1-10.

* cited by examiner

ELECTROSTATIC TRANSDUCER AND ELECTROSTATIC TRANSDUCER UNIT

CROSS-REFERENCE TO RELATED APPLICATIONS

This application is a continuation application of International Application number PCT/JP2020/014158, filed on Mar. 27, 2020, which claims the priority benefit of Japan Patent Application No. 2019-063144, filed on Mar. 28, 2019. The entirety of each of the above-mentioned patent applications is hereby incorporated by reference herein and made a part of this specification.

BACKGROUND

Technical Field

The present disclosure relates to an electrostatic transducer and an electrostatic transducer unit.

Related Art

An electrostatic sensor is known which detects approach or contact of a human finger or the like based on a change in capacitance. In addition, an electrostatic actuator utilizing a change in capacitance is also known. For example, a steering wheel provided with an electrostatic sensor detecting that the driver does not have his hands on the steering wheel is set forth in Japanese Patent Laid-open No. 2014-190856. Furthermore, the steering wheel set forth in Japanese Patent Laid-open No. 2014-190856 has a heater function by winding a heater wire on an outer peripheral side of a shaft core in a coil shape and arranging the electrostatic sensor on the outer peripheral side of the heater wire. Besides, Japanese Patent Laid-open No. 5-172839 describes that output voltage is controlled by making electrodes arranged on both sides of a piezoelectric film into a mesh form and changing the degree of the mesh.

Electrostatic transducers (including sensors and actuators) are required to be thinner. However, a reduced thickness causes an increase in capacitance between electrodes. The larger the capacitance, the larger the current flowing through the electrodes, and it is necessary to make a power supply circuit large accordingly. Therefore, by adopting mesh-shaped electrodes and reducing degree of mesh (electrode occupancy rate, area ratio of conductive components) of the electrode, the capacitance between electrodes can be reduced. As a result, the electrostatic transducer can be thinned without making the power supply circuit large.

In addition, in an electrostatic transducer, one of the electrode pairs may function as a shield electrode to prevent influence of disturbance. By making one of the electrode pairs to function as the shield electrode, the detection precision as a sensor or the operation precision as an actuator can be enhanced.

However, if the degree of mesh of the electrodes is reduced to prevent the capacitance from increasing when the electrostatic transducer is thinned, the function as the shield electrode is deteriorated. This may cause a decrease in the detection precision or the operation precision.

SUMMARY

The present disclosure provides an electrostatic transducer capable of reducing thickness and enhancing detection precision or operation precision. Furthermore, the present disclosure provides a unit including the electrostatic transducer.

1. Electrostatic Transducer

The electrostatic transducer according to the present disclosure includes an insulating sheet, a first electrode sheet arranged on the front surface side of the insulating sheet and having a plurality of first through holes penetrating in a thickness direction, and a second electrode sheet arranged on the back surface side of the insulating sheet and having no through holes in the thickness direction or having a plurality of second through holes in the thickness direction. An aperture ratio of the plurality of second through holes is smaller than an aperture ratio of the plurality of first through holes.

According to the electrostatic transducer of the present disclosure, whether the second electrode sheet has no through holes or has the second through holes, the surface including the first electrode sheet has a smaller area ratio of the portion functioning as an electrode per unit area (electrode occupancy rate) than the second electrode sheet.

That is, the electrode occupancy rate per unit area on the surface including the first electrode sheet which is arranged on the front surface side can be reduced. As a result, the capacitance between electrodes can be reduced even if a distance between the electrodes is shortened. Therefore, the electrostatic transducer can be thinned and the capacitance can be reduced.

On the other hand, the surface including the second electrode sheet which is arranged on the back surface side has a higher electrode occupancy rate than the first electrode sheet. Therefore, the second electrode sheet can function as the shield electrode so as to reduce the influence of disturbance. As a result, the electrostatic transducer can enhance the detection precision as a sensor or the operation precision as an actuator.

2. Electrostatic Transducer Unit

The electrostatic transducer unit includes: a core material having a center line; the aforementioned electrostatic transducer, wherein the electrostatic transducer is arranged along an outer peripheral surface of the core material so that the back surface of the second electrode sheet faces the outer peripheral surface of the core material centering on the center line; and a resin inner layer material interposed between the outer peripheral surface of the core material and the back surface of the electrostatic transducer, and fixed to the core material and the electrostatic transducer. In the electrostatic transducer, end sides in a circumferential direction of the outer peripheral surface of the core material are defined as first end sides, two first end sides of the electrostatic transducer are arranged opposite to each other with a space therebetween in the circumferential direction of the outer peripheral surface of the core material, and the resin inner layer material is interposed in a space between the two first end sides.

When the electrostatic transducer is arranged along the outer peripheral surface of the core material, the resin inner layer material is arranged between the outer peripheral surface of the core material and the back surface of the electrostatic transducer, and the resin inner layer material is fixed to the outer peripheral surface of the core material and the back surface of the electrostatic transducer. Thus, the electrostatic transducer can be prevented from peeling off from the core material.

Furthermore, by interposing the resin inner layer material in the space between the two opposing end sides of the electrostatic transducer, the design property of the electrostatic transducer unit is satisfactory. In addition, by applying the resin inner layer material, the electrostatic transducer unit can be easily manufactured.

DESCRIPTION OF THE EMBODIMENTS

1. Application Target of Electrostatic Transducer

Figure 1:
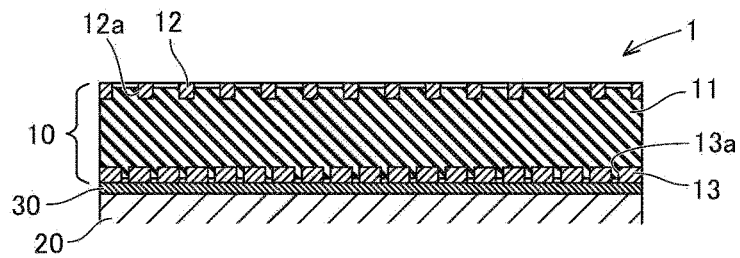
FIG. 1 is a longitudinal sectional view of a transducer of a first example.

An electrostatic transducer (hereinafter, referred to as "transducer") includes, for example, a substrate and an electrostatic sheet attached to a mounting surface of the substrate. The substrate is any member formed by metal, resin, or other materials.

In addition, the mounting surface of the substrate may be formed into a three-dimensional shape such as a curved surface, a composite flat surface, or a combined shape of flat surface and curved surface, or the surface of the substrate may be formed into a single planar shape. When the substrate is formed of a flexible material, the electrostatic sheet can also be attached to the mounting surface of the substrate. In addition, the transducer can also be used as a single electrostatic sheet without including the substrate.

The electrostatic sheet can function as an actuator that generates vibration or sound by utilizing a change in capacitance between electrodes. Besides, the electrostatic sheet can function as a sensor for detecting an external pressing force or a sensor for detecting contact or approach of a conductor by utilizing a change in capacitance between electrodes.

When the electrostatic sheet functions as an actuator, by applying a voltage to the electrodes, an insulator is deformed according to the potential between the electrodes, and vibration is generated along with the deformation of the insulator. When the electrostatic sheet functions as a pressing force detection sensor, the insulator is deformed due to input of external pressing force, vibration, sound, or the like, and the capacitance between the electrodes is changed accordingly. By detecting the voltage according to the capacitance between the electrodes, the external pressing force and the like are detected. In addition, when the electrostatic sheet functions as a contact and proximity sensor, the capacitance between the electrodes is changed due to the contact or approach of the conductor, and the contact or approach of the conductor is detected by detecting the voltage corresponding to the changed capacitance between the electrodes.

The transducer can be applied to, for example, a surface of a mouse or a joystick being a pointing device, a surface of a vehicle component, and the like. The vehicle components include armrests, door knobs, shift levers, steering wheels, door trims, center trims, center consoles, ceilings and the like. In many cases, the substrate is formed of a material having no flexibility, such as metal or hard resin. Besides, the transducer can detect the state of a target person and impart a vibration to the target person.

In addition, the transducer may also be arranged on the surface side of the seat surface. In this case, the transducer may be configured in such a manner that the electrostatic sheet is attached to a substrate formed of a flexible material such as a resin film. Besides, the transducer may also be formed by a single electrostatic sheet without including the substrate.

Besides, the electrostatic sheet of the transducer may also be configured to have a heater function. In this case, in addition to detecting the state of a target person and imparting a vibration to the target person, the transducer can also impart heat to the target person.

2. First Example 2-1. Configuration of Transducer 1 of First Example

The configuration of a transducer 1 of a first example is described with reference to FIGS. 1 to 3B. As shown in FIG.

1, the transducer 1 includes at least an electrostatic sheet 10. In the first example, the transducer 1 including a substrate 20 and a substrate side fused sheet 30 is taken as an example. However, the transducer 1 may not include the substrate 20 and the substrate side fused sheet 30. The substrate 20 is formed of any material such as metal or resin.

The electrostatic sheet 10 is elastically deformable as a whole. The electrostatic sheet 10 is attached to a mounting surface of the substrate 20. Besides, the electrostatic sheet 10 can be mounted along the curved mounting surface of the substrate 20 even if the mounting surface of the substrate 20 is a three-dimensional curved surface. In particular, generation of wrinkles on the electrostatic sheet 10 can be suppressed by mounting the electrostatic sheet 10 on the mounting surface of the substrate 20 while stretching the electrostatic sheet 10 in a surface direction.

The electrostatic sheet 10 includes at least an insulating sheet 11, a first electrode sheet 12, and a second electrode sheet 13. The insulating sheet 11 is formed of an elastomer. Thus, the insulating sheet 11 is elastically deformable. The insulating sheet 11 is formed of, for example, a thermoplastic elastomer. The insulating sheet 11 may be formed of the thermoplastic elastomer, or may be formed of an elastomer crosslinked by heating the thermoplastic elastomer as a raw material.

Here, the insulating sheet 11 may be at least one kind selected from elastomers such as styrene elastomer, olefin elastomer, vinyl chloride elastomer, urethane elastomer, ester elastomer, and amide elastomer. For example, the styrene elastomer includes SBS, SEBS, SEPS and the like. The olefin elastomer includes EEA, EMA, EMMA, as well as a copolymer of ethylene and α-olefin (ethylene-octene copolymer) and the like.

The insulating sheet 11 may also include rubber or resin other than the thermoplastic elastomer. For example, when rubber such as ethylene-propylene rubber (EPM, EPDM) is included, the flexibility of the insulating sheet 11 is improved. In terms of improving the flexibility of the insulating sheet 11, the insulating sheet may contain a flexibility-imparting component such as a plasticizer.

The first electrode sheet 12 is arranged on the front surface (upper surface in FIG. 1) side of the insulating sheet 11. In addition, the first electrode sheet 12 has conductivity, and also has flexibility and stretchability in the surface direction. The first electrode sheet 12 is formed of, for example, a conductive elastomer, a conductive cloth, a metal sheet, or the like.

Figure 2A:
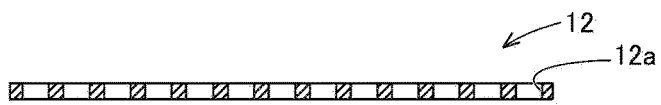
FIG. 2A is a longitudinal sectional view of a first electrode sheet constituting the transducer of the first example.
Figure 2B:
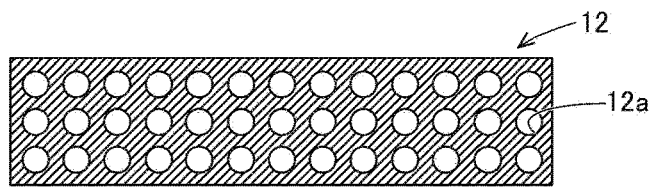
FIG. 2B is a cross-sectional view of the first electrode sheet.

Furthermore, as shown in FIG. 1, FIG. 2A and FIG. 2B, the first electrode sheet 12 has a plurality of first through holes 12a penetrating in a thickness direction. The first through holes 12a mean a region (insulating region) where no conductive component exists. That is, a surface including the first electrode sheet 12 is composed of a conductive region where the first electrode sheet 12 exists and insulating regions where the first through holes 12a exist. The first through holes 12a may be empty holes, or may have insulating elastomer or the like therein. In FIG. 1, FIG. 2A, and FIG. 2B, the first electrode sheet 12 is shown to have the first through holes 12a as empty holes.

When the transducer 1 is used as a sensor for detecting approach or contact of a human finger, the aperture ratio of the plurality of first through holes 12a may be 30% or more. The aperture ratio of the plurality of first through holes 12a is preferably 50% or more, and further preferably 60% or more. The aperture ratio of the plurality of first through holes 12a means a ratio of regions formed only by an insulating material (including empty holes, insulating elastomer, and the like) in a predetermined region when the first electrode sheet 12 is viewed from a normal direction. In other words, the aperture ratio is a ratio of existence of the first through holes 12a per unit area on the surface including the first electrode sheet 12.

Moreover, the ratio of the portion functioning as an electrode per unit area (electrode occupancy rate) on the surface including the first electrode sheet 12 is a ratio obtained by subtracting the aperture ratio from 100%. Therefore, the electrode occupation rate of the first electrode sheet 12 is less than 70%, preferably less than 50%, more preferably less than 40%.

Furthermore, the first electrode sheet 12 is fixed to the insulating sheet 11 by fusion bonding (for example, thermal fusion bonding) of the insulating sheet 11 itself. That is, a part of the front surface side of the insulating sheet 11 functions as a fusion material to be fixed to the first electrode sheet 12. Therefore, the first electrode sheet 12 and the insulating sheet 11 are fixed to each other without using a volatile adhesive or an organic solvent.

Because the first electrode sheet 12 has the first through holes 12a, a part of the front surface side of the insulating sheet 11 can enter the first through holes 12a. In this way, the first electrode sheet 12 is embedded in the insulating sheet 11. That is, the first electrode sheet 12 is fixed by the part of the insulating sheet 11 that has entered the first through holes 12a. Therefore, the insulating sheet 11 and the first electrode sheet 12 are more firmly integrated.

Here, in the first example, the first electrode sheet 12 formed of a conductive elastomer is taken as an example. The conductive elastomer is an elastomer containing a conductive filler.

The elastomer used for the first electrode sheet 12 may be made of a material having the same main component as that of the insulating sheet 11. That is, the first electrode sheet 12 may be at least one kind selected from elastomers such as styrene elastomer, olefin elastomer, vinyl chloride elastomer, urethane elastomer, ester elastomer, and amide elastomer. For example, the styrene elastomer includes SBS, SEBS, SEPS and the like. The olefin elastomer includes EEA, EMA, EMMA, as well as a copolymer of ethylene and α-olefin (ethylene-octene copolymer) and the like.

However, the first electrode sheet 12 is made to have a higher softening point than the insulating sheet 11. The reason is that when the first electrode sheet 12 is fixed to the insulating sheet 11 by fusion bonding (for example, thermal fusion bonding) of the insulating sheet 11 itself, the insulating sheet 11 can be softened earlier than the first electrode sheet 12. In addition, in the first example, the first through holes 12a may be formed by, for example, punching after a conductor sheet having no through holes is formed.

When the transducer 1 is used as the sensor for detecting the approach or contact of a human finger, the first through holes 12a need to be large enough to detect the human finger. In other words, the aperture area of each first through hole 12a is formed to have a size corresponding to the human finger. That is, the aperture area of each first through hole 12a is formed to be sufficiently small with a contact range of the human finger as a reference.

Specifically, the diameter of the maximum inscribed circle of the first through hole 12a may be set to 150 μm or more and 15 mm or less. As shown in FIG. 2B, when the first through hole 12a is a circular hole, the inner diameter of the first through hole 12a is equal to the diameter of the maximum inscribed circle. In addition, when the first through hole 12a has an elliptical shape, the minor axis of the ellipse is the diameter of the maximum inscribed circle.

When the first through hole 12a has a rectangular shape, the distance between the shorter opposite sides of the rectangle is the diameter of the maximum inscribed circle. For example, when the first electrode sheet 12 is a conductive woven fabric, a shorter interval of an interval between adjacent warp threads and an interval between adjacent weft threads is the diameter of the maximum inscribed circle.

Furthermore, the aperture area of each first through hole 12a may be set to 6400 μm² or more and 225 mm² or less. Besides, it is preferable that the diameter of the maximum inscribed circle of the first through hole 12a is set in the above range and the aperture area is also set in the above range.

By setting the diameter of the maximum inscribed circle of the first through hole 12a to 150 μm or more as described above, the first through hole 12a expands (the periphery of the first through hole 12a stretches) when covering the surface of a three-dimensional object, and the surface of the three-dimensional object can be easily covered. Also, the same effect can be obtained by setting the minimum value of the aperture area of each first through hole 12a to 6400 μm² or more.

In addition, the maximum value of 15 mm of the diameter of the maximum inscribed circle of the first through holes 12a corresponds to a width that allows a human finger to touch. Accordingly, the transducer 1 can be reliably used as a sensor for detecting contact of a human finger. Also, by setting the maximum value of the aperture area of each first through hole 12a to 225 mm² or less, the transducer 1 can be reliably used as a sensor for detecting contact of a human finger.

Therefore, when the transducer 1 is a sensor for detecting a human finger, the diameter of the maximum inscribed circle of the first through holes 12a may be set to a value close to 15 mm. That is, the diameter of the maximum inscribed circle of the first through holes 12a is preferably set to 5 mm or more and 15 mm or less, and more preferably 10 mm or more and 15 mm or less. In addition, the aperture area of each first through hole 12a may be set to a value close to 225 mm². That is, the aperture area of each first through hole 12a is preferably set to 100 mm² or more and 225 mm² or less, and more preferably 150 mm² or more and 225 mm² or less.

The second electrode sheet 13 is arranged on the back surface (lower surface in FIG. 1) side of the insulating sheet 11. The second electrode sheet 13 faces the first electrode sheet 12. Similar to the first electrode sheet 12, the second electrode sheet 13 has conductivity, and also has flexibility and stretchability in the surface direction. The second electrode sheet 13 is formed of the same material as the first electrode sheet 12.

Furthermore, the second electrode sheet 13 is fixed to the insulating sheet 11 by fusion bonding (for example, thermal fusion bonding) of the insulating sheet 11 itself. That is, a part of the back surface side of the insulating sheet 11 functions as a fusion material to be fixed to the second electrode sheet 13. Thus, the second electrode sheet 13 and the insulating sheet 11 are fixed to each other without using a volatile adhesive or an organic solvent.

Figure 3A:
FIG. 3A is a longitudinal sectional view of a second electrode sheet constituting the transducer of the first example.
Figure 3B:
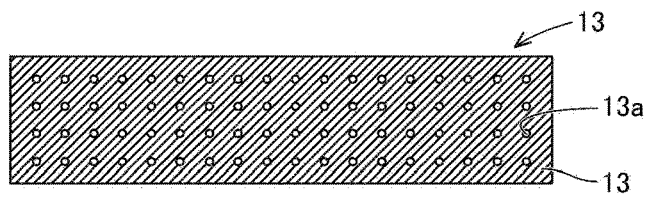
FIG. 3B is a cross-sectional view of the second electrode sheet.

The second electrode sheet 13 may have no through holes in the thickness direction, or may have a plurality of second through holes 13a as shown in FIG. 1, FIG. 3A and FIG. 3B. The second through holes 13a mean regions (insulating region) where no conductive component exists.

When the second electrode sheet 13 has no through holes, the conductive component is present in the entire planar region. When the second electrode sheet 13 is made to function as the shield electrode, the second electrode sheet 13 exerts maximum shielding function when it has no through holes.

On the other hand, when the second electrode sheet 13 has the second through holes 13a, the second electrode sheet 13 is formed by a conductive region in which the second electrode sheet 13 exists and insulating regions in which the second through holes 13a exist. Similar to first through holes 12a, the second through holes 13a may be empty holes, or may have insulating elastomer or the like therein. In FIG. 1, FIG. 3A, and FIG. 3B, the second electrode sheet 13 is shown to have the second through holes 13a as empty holes.

Besides, when the second electrode sheet 13 functions as the shield electrode, the aperture ratio of the second through holes 13a may be smaller than the aperture ratio of the first through holes. The aperture ratio of the second through holes 13a may be less than 50%. A preferred aperture ratio of the second through holes 13a is less than 40%, and a more preferred aperture ratio is less than 30%. The aperture ratio of the second through holes 13a means a ratio of regions formed only by an insulating material (including empty holes, insulating elastomer, and the like) in a predetermined region when the second electrode sheet 13 is viewed from the normal direction. In other words, the aperture ratio is a ratio of existence of the second through holes 13a per unit area on the surface including the second electrode sheet 13.

Moreover, the ratio of the portion functioning as an electrode per unit area (electrode occupancy rate) on the surface including the second electrode sheet 13 is a ratio obtained by subtracting the aperture ratio from 100%. Therefore, the electrode occupancy rate of the second electrode sheet 13 is 50% or more, preferably 60% or more, and more preferably 70% or more. That is, the surface including the second electrode sheet 13 has a higher electrode occupation rate than the surface including the first electrode sheet 12.

Furthermore, the aperture area of each second through hole 13a is smaller than the aperture area of each first through hole 12a. As described above, when the transducer 1 is used as the sensor for detecting the approach or contact of a human finger, the aperture area of each first through hole 12a needs to be large enough to detect the human finger. On the other hand, each second through hole 13a is made sufficiently small with respect to the human finger.

Specifically, the diameter of the smallest circumscribed circle of the second through hole 13a may be set to 0 mm or more and 10 mm or less. As shown in FIG. 3B, when the second through hole 13a is a circular hole, the inner diameter of the second through hole 13a is equal to the diameter of the smallest circumscribed circle. In addition, when the second through hole 13a is elliptical, the major axis of the ellipse is the diameter of the smallest circumscribed circle. When the second through hole 13a is rectangular, the distance between the opposite corners of the rectangle is the diameter of the smallest circumscribed circle.

Furthermore, the aperture area of each second through hole 13a may be set to 0 m² or more and 100 mm² or less. Besides, it is preferable that the diameter of the smallest circumscribed circle of the second through hole 13a is set in the above range and the aperture area is also set in the above range.

In addition, when the second electrode sheet 13 has the second through holes 13a, a part of the back surface side of the insulating sheet 11 can enter the second through holes 13a. In this way, the second electrode sheet 13 is embedded in the insulating sheet 11. In this case, the second electrode sheet 13 is fixed by the part of the insulating sheet 11 that has entered the second through holes 13a. Therefore, the insulating sheet 11 and the second electrode sheet 13 are more firmly integrated.

Here, in the first example, similar to the first electrode sheet 12, the second electrode sheet 13 formed of a conductive elastomer is taken as an example. The elastomer used for the second electrode sheet 13 is the same as that for the first electrode sheet 12. In addition, the second through holes 13a may be formed by, for example, punching after a conductor sheet having no through holes is formed.

The substrate side fused sheet 30 is formed of the same material as the insulating sheet 11. By fusion bonding (for example, thermal fusion bonding) of the substrate side fused sheet 30 itself, the substrate side fused sheet 30 is fixed to the mounting surface of the substrate 20 and to the back surface of the second electrode sheet 13.

2-2. Method of Manufacturing Transducer 1 in First Example

Figure 4:
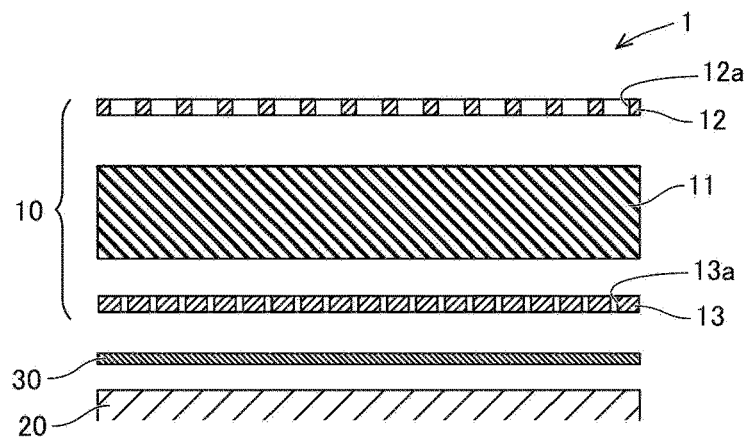
FIG. 4 is a diagram showing a method of manufacturing the transducer of the first example.

A method of manufacturing the transducer 1 of the first example is described with reference to FIG. 4. As shown in FIG. 4, the first electrode sheet 12 is arranged on the front surface side of the insulating sheet 11, and the second electrode sheet 13 is arranged on the back surface side of the insulating sheet 11 (preparation step). In this way, a laminated body is prepared.

Subsequently, the prepared laminated body is heated and pressed in the laminating direction (first heating and pressing step). Then, the front surface of the insulating sheet 11 is softened, and at least a part of the first electrode sheet 12 is embedded from the front surface of the insulating sheet 11. Then, the front surface of the insulating sheet 11 functions as the fusion material, and the first electrode sheet 12 is fixed to the insulating sheet 11. Furthermore, the back surface of the insulating sheet 11 is softened, and at least a part of the second electrode sheet 13 is embedded from the back surface of the insulating sheet 11. Then, the back surface of the insulating sheet 11 functions as the fusion material, and the second electrode sheet 13 is fixed to the insulating sheet 11.

Subsequently, the back surface side of the second electrode sheet 13 which is in an integrated state in the first heating and pressing step is pressed against the front surface of the substrate side fused sheet 30 in a state that the surface of the substrate side fused sheet 30 is heated and softened (second heating and pressing step). Then, the back surface side of the second electrode sheet 13 is fixed to the substrate side fused sheet 30 by fusion bonding of the substrate side fused sheet 30 itself.

Subsequently, the mounting surface of the substrate 20 is pressed against the back surface of the substrate side fused sheet 30 in a state that the back surface of the substrate side fused sheet 30 is heated and softened (third heating and pressing step). Then, the mounting surface of the substrate 20 is fixed to the substrate side fused sheet 30 by fusion bonding of the substrate side fused sheet 30 itself. In this way, the transducer 1 is manufactured.

Here, the material of the insulating sheet 11 may contain a crosslinking agent. In this case, by heating in the first heating and pressing step, the insulating sheet 11 can be crosslinked while being fixed by fusion bonding of the insulating sheet 11. After the first heating and pressing step, the insulating sheet 11 is formed of a crosslinked elastomer.

In addition, when the material of the insulating sheet 11 contains a crosslinking agent, additional heating for crosslinking can also be performed after the first heating and pressing step (crosslinking step). In this case, the insulating sheet 11 can be crosslinked by additional heating after the insulating sheet 11 is fixed by fusion bonding. In this case, the insulating sheet 11 is formed of a crosslinked elastomer after the crosslinking step of performing additional heating.

In addition, in the first heating and pressing step, the step of fixing the first electrode sheet 12 and the insulating sheet 11 and the step of fixing the second electrode sheet 13 and the insulating sheet 11 may be performed separately. Besides, the substrate side fused sheet 30 may be fixed to the substrate 20 before being fixed to the second electrode sheet 13 which is in the integrated state in the first heating and pressing step. In addition, when the substrate 20 does not exist, the substrate side fused sheet 30 may be unnecessary.

2-3. Effect of the Transducer 1 of the First Example

According to the transducer 1 of the first example, whether the second electrode sheet 13 has no through holes or has the second through holes 13a, the surface including the first electrode sheet 12 has a smaller area ratio of the portion functioning as an electrode per unit area (electrode occupancy rate) than the second electrode sheet 13.

That is, the electrode occupancy rate per unit area on the surface including the first electrode sheet 12 arranged on the front surface side can be reduced. As a result, the capacitance between the electrodes can be reduced even if the distance between the electrodes is shortened. Therefore, the transducer 1 can be thinned and the capacitance can be reduced.

On the other hand, the surface including the second electrode sheet 13 arranged on the back surface side has a higher electrode occupancy rate than the surface including the first electrode sheet. Therefore, the second electrode sheet 13 can be made to function as a shield electrode so as to reduce the influence of disturbance. As a result, the transducer 1 can improve the detection precision as a sensor and the operation precision as an actuator.

3. Transducer 2 of Second Example

Figure 5:
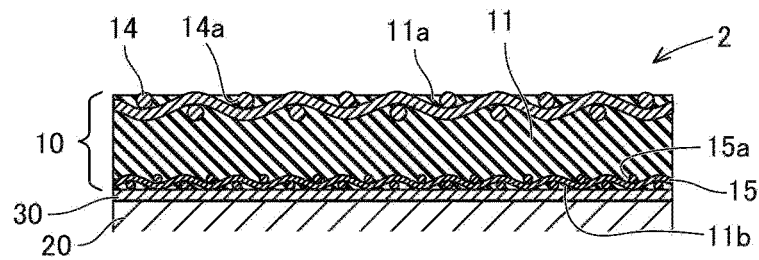
FIG. 5 is a longitudinal sectional view of a transducer of a second example.

The configuration of a transducer 2 of a second example is described with reference to FIG. 5. The transducer 2 of the second example includes a first electrode sheet 14 and a second electrode sheet 15 instead of the first electrode sheet 12 and the second electrode sheet 13 of the transducer 1 in the first example. Moreover, in the second example, the same components as those in the first example are designated by the same reference signs and the description thereof is omitted.

In the second example, the first electrode sheet 14 and the second electrode sheet 15 which are made of a conductive cloth is taken as an example. The conductive cloth is a woven or non-woven fabric formed of conductive fibers. Here, the conductive fiber is formed by, for example, coating the surface of flexible fibers with a conductive material. The conductive fiber is formed by, for example, plating the surface of resin fibers such as polyethylene with copper, nickel or the like.

Therefore, the first electrode sheet 14 has a plurality of first through holes 14a, and the second electrode sheet 15 has a plurality of second through holes 15a. Besides, the aperture ratio of the second through holes 15a is smaller than the aperture ratio of the first through holes 14a. That is, the electrode occupation rate of the second electrode sheet 15 is higher than the electrode occupation rate of the first electrode sheet 12.

For example, the conductive threads forming the first electrode sheet 14 are thicker than the conductive threads forming the second electrode sheet 15, the first electrode sheet 14 is braided relatively coarsely, and the second electrode sheet 15 is braided relatively finely. In this way, the second through holes 15a can be made smaller than the first through holes 14a.

The transducer 2 of the second example also has the same effect as the transducer 1 in the first example. That is, the transducer 2 can be thinned and the detection precision and the operation precision can be enhanced.

Furthermore, compared to the first example, at least a part of the first electrode sheet 14 can be embedded in the insulating sheet 11 more deeply. For example, when the front surface of the first electrode sheet 14 is formed in a concave-convex shape, the concave portion of the front surface is further deeply embedded in the insulating sheet 11.

In this case, the insulating sheet 11 includes, on the front surface side of the first electrode sheet 14, a first coating layer 11a formed by a part of the front surface side of the insulating sheet 11. Therefore, at least a part of the front surface of the first electrode sheet 14 is fixed to the first coating layer 11a by fusion bonding of the first coating layer 11a itself. As a result, the insulating sheet 11 and the first electrode sheet 14 are more firmly integrated.

Similar to the first electrode sheet 14, at least a part of the second electrode sheet 15 can be embedded in the insulating sheet 11 more deeply. For example, when the back surface of the second electrode sheet 15 is formed in a concave-convex shape, the concave portion of the back surface is embedded in the insulating sheet 11 more deeply.

In this case, the insulating sheet 11 includes, on the back surface side of the second electrode sheet 15, a second coating layer 11b formed by a part of the back surface side of the insulating sheet 11. Therefore, at least a part of the back surface of the second electrode sheet 15 is fixed to the second coating layer 11b by fusion bonding of the second coating layer 11b itself. As a result, the insulating sheet 11 and the second electrode sheet 15 are more firmly integrated.

4. Transducer 3 of Third Example

Figure 6:
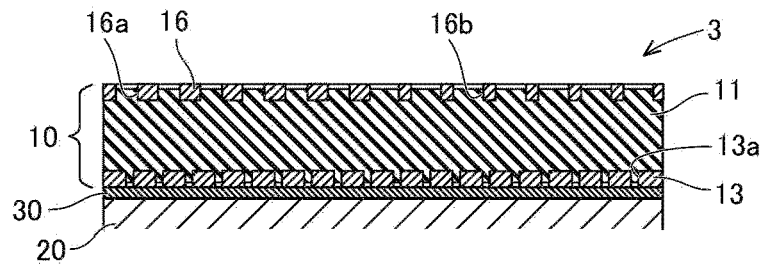
FIG. 6 is a longitudinal sectional view of a transducer of a third example.

The configuration of a transducer 3 of a third example is described with reference to FIG. 6 and FIG. 7. The transducer 3 of the third example includes a first electrode sheet 16 instead of the first electrode sheet 12 of the transducer 1 in the first example. Moreover, in the third example, the same components as those in the first example are designated by the same reference signs and the description thereof is omitted.

Figure 7:
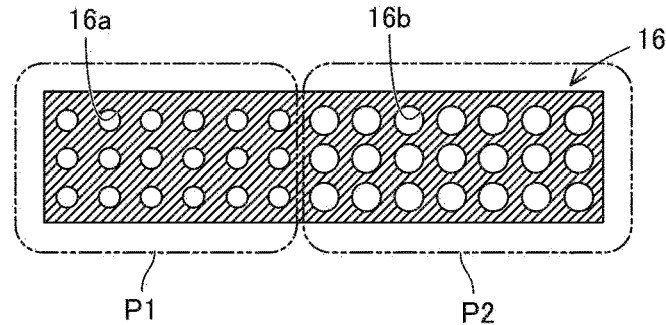
FIG. 7 is a cross-sectional view of a first electrode sheet constituting the transducer of the third example.

In the third example, as shown in FIG. 7, the first electrode sheet 16 has at least two detection regions P1 and P2. The first electrode sheet 16 may have two detection regions P1 and P2, or may have three or more detection regions. Each of the detection regions P1 and P2 has first through holes 16a and 16b having different aperture areas, respectively. That is, the aperture area of the first through hole 16a formed in the first detection region P1 is different from the aperture area of the first through hole 16b formed in the second detection region P2. In FIG. 7, the first through hole 16a in the first detection region P1 has a smaller aperture area than the first through hole 16b in the second detection region P2.

Therefore, in the first electrode sheet 16, the electrode occupancy rate varies depending on the detection regions P1 and P2. For example, the detected capacitance is different when a human finger approaches or contacts. As a result, the position where the human finger approaches or contacts can be detected on the basis of the difference in capacitance even when a plurality of detection regions P1 and P2 are formed by one first electrode sheet 16. Moreover, the shape of the first through holes 16a and 16b is not limited to a circular shape, and may be various shapes.

5. Transducer 4 of Fourth Example

Figure 8:
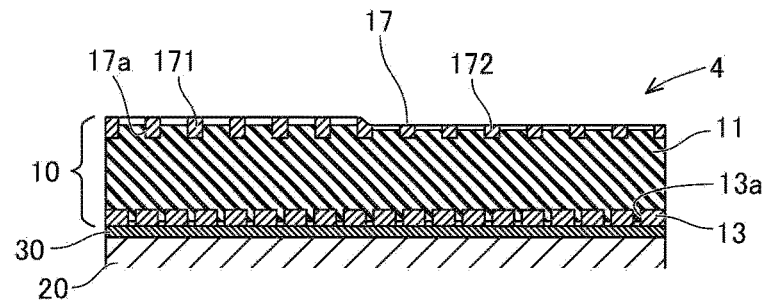
FIG. 8 is a longitudinal sectional view of a transducer of a fourth example.

The configuration of a transducer 4 of a fourth example is described with reference to FIG. 8 and FIG. 9. The transducer 4 of the fourth example includes a first electrode sheet 17 instead of the first electrode sheet 12 of the transducer 1 in the first example. Moreover, in the fourth example, the same components as those in the first example are designated by the same reference signs and the description thereof is omitted.

Figure 9:
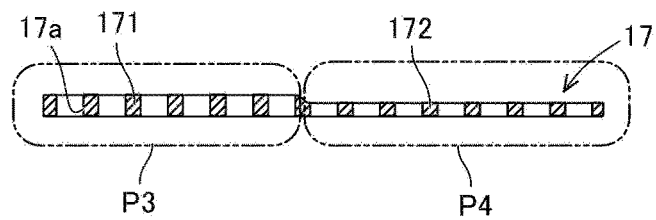
FIG. 9 is a longitudinal sectional view of a first electrode sheet constituting the transducer of the fourth example.

In the fourth example, as shown in FIG. 9, the first electrode sheet 17 has at least two detection regions P3 and P4. The first electrode sheet 17 may have two detection regions P3 and P4, or may have three or more detection regions. Each of the detection regions P3 and P4 is different in thicknesses. Here, a plurality of first through holes 17a have the same shape.

That is, a portion 171 of the first detection region P3 in the first electrode sheet 17 and a portion 172 of the second detection region P4 in the first electrode sheet 17 have different thicknesses. In FIG. 8 and FIG. 9, the portion 171 of the first detection region P3 is thicker than the portion 172 of the second detection region P4. Furthermore, the first electrode sheet 17 is arranged in such a manner that a step formed by a difference in thickness is located on the front surface side of the first electrode sheet 17.

The detected capacitance is different when a human finger is particularly close. As a result, the position where the human finger approaches can be detected on the basis of the difference in capacitance even when the plurality of detection regions P3 and P4 are formed by one first electrode sheet 17. Moreover, in the first detection region P3 and the second detection region P4, the first through holes 17a have the same shape, but the first through holes 17a may also have different shapes.

6. Transducer 5 of Fifth Example

Figure 10:
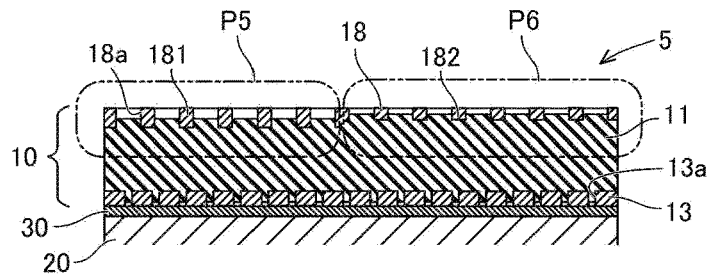
FIG. 10 is a longitudinal sectional view of a transducer of a fifth example.

The configuration of a transducer 5 of a fifth example is described with reference to FIG. 10. The transducer 5 of the fifth example includes a first electrode sheet 18 instead of the first electrode sheet 17 of the transducer 4 of the fourth example. Moreover, in the fifth example, the same components as those in the fourth example are designated by the same reference signs and the description thereof is omitted.

In the fifth example, similar to the first electrode sheet 17 of the fourth example, the first electrode sheet 18 has different thicknesses. That is, as shown in FIG. 10, the first electrode sheet 18 has at least two detection regions P5 and P6. The first electrode sheet 18 may have two detection regions P5 and P6, or may have three or more detection regions. Each of the detection regions P5 and P6 is different in thicknesses. That is, a portion 181 of the first detection region P5 in the first electrode sheet 18 and a portion 182 of the second detection region P6 in the first electrode sheet 18 have different thickness. Here, a plurality of first through holes 18a have the same shape.

Then, the first electrode sheet 18 is arranged in such a manner that a step formed by a difference in thickness is located on the back surface side of the first electrode sheet 18. That is, the separation distance between the back surface of the first electrode sheet 18 and the front surface of the second electrode sheet 13 is different between the first detection region P5 and the second detection region P6.

Therefore, the detected capacitance is different when a human finger approaches or touches. As a result, the position where the human finger approaches or contacts can be detected on the basis of the difference in capacitance even when the plurality of detection regions P5 and P6 are formed by one first electrode sheet 18. Moreover, in the first detection region P5 and the second detection region P6, the first through holes 18a have the same shape, but the first through holes 18a may also have different shapes.

7. Transducer 6 of Sixth Example

7-1. Configuration of Transducer 6 of Sixth Example

Figure 11:
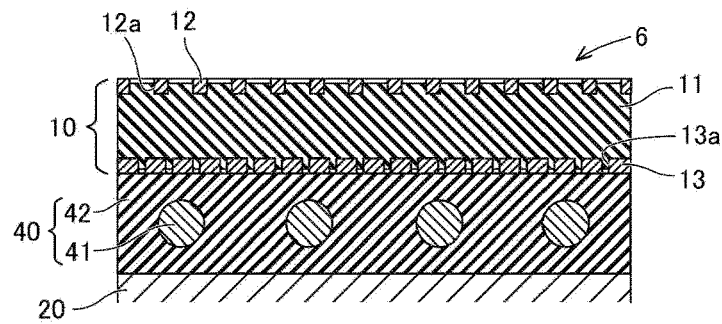
FIG. 11 is a longitudinal sectional view of a transducer of a sixth example.

The configuration of a transducer 6 of a sixth example is described with reference to FIG. 11. As shown in FIG. 11, the transducer 6 includes the electrostatic sheet 10, the substrate 20, and a heater sheet 40 arranged between the back surface of the electrostatic sheet 10 and the front surface of the substrate 20. That is, the transducer 6 has a heater function in addition to the sensor function or actuator function.

Here, the electrostatic sheet 10 may be any one of the electrostatic sheets 10 in the transducers 1, 2, 3, 4 and 5 in the above examples. However, the insulating sheet 11 that constitutes the electrostatic sheet 10 may be formed of the following materials so as to allow the heat of the heater sheet 40 to be transferred to the front surface of the electrostatic sheet 10 and to ensure heat resistance.

The thermal conductivity of the insulating sheet 11 is 0.3 W/m·K or more. The thermal conductivity is preferably 0.4 W/m·K or more, and further preferably 0.5 W/m·K or more. It is desirable that the insulating sheet 11 has an insulating inorganic filler having a relatively high thermal conductivity. The thermal conductivity of the inorganic filler (thermally conductive filler) which is used to increase the thermal conductivity of the insulating sheet 11 is suitably 5 W/m·K or more, preferably 10 W/m·K or more, and more preferably 20 W/m·K or more. The inorganic filler having a relatively high thermal conductivity may be a metal filler such as magnesium oxide, aluminum oxide, aluminum nitride, and the like. In addition to the metal filler, boron nitride, silicon carbide and the like can also be used as the inorganic filler having a relatively high thermal conductivity.

In addition, from the viewpoint of imparting flame retardancy to the insulating sheet 11, the insulating sheet 11 preferably has a flame-retardant and insulating inorganic filler. The flame-retardant filler may be a hydroxide filler such as magnesium hydroxide, aluminum hydroxide, and the like. In addition to the hydroxide filler, boron nitride and the like can also be used as the flame-retardant filler. Besides, the flame-retardant filler can also be used as the inorganic filler (thermally conductive filler) which is used to increase the thermal conductivity of the insulating sheet 11.

In addition, from the viewpoint of ensuring the insulating property of the insulating sheet 11, the volume resistivity of the insulating sheet 11 is $1\times10^{12}$ Ω·cm or more. The volume resistivity is preferably $1\times10^{13}$ Ω·cm or more.

The heater sheet 40 is arranged on the back surface side of the electrostatic sheet 10, that is, on the back surface side of the second electrode sheet 13. The heater sheet 40 includes a heater wire 41 and a heater insulating layer 42 that covers the heater wire 41. The heater wire 41 is an alloy material of metal, such as nickel chrome, iron chrome, and the like. The heater wire 41 is formed by, for example, reciprocally forming a wire rod or winding the wire rod in a spiral shape so as to have a sheet shape.

The heater insulating layer 42 is arranged so as to surround the heater wire 41 and not expose the heater wire 41. The heater insulating layer 42 may be made of the same material as the insulating sheet 11. Furthermore, a part of the front surface side of the heater insulating layer 42 is fixed to the back surface of the second electrode sheet 13 by fusion bonding (for example, thermal fusion bonding) of the heater insulating layer 42 itself. In addition, the front surface side of the heater insulating layer 42 is also fixed to the exposed back surface of the insulating sheet 11 by fusion bonding of the heater insulating layer 42 itself. Besides, a part of the back surface side of the heater insulating layer 42 is fixed to the mounting surface of the substrate 20 by fusion bonding (for example, thermal fusion bonding) of the heater insulating layer 42 itself.

7-2. Method of Manufacturing Transducer 6 of Sixth Example

Figure 12:
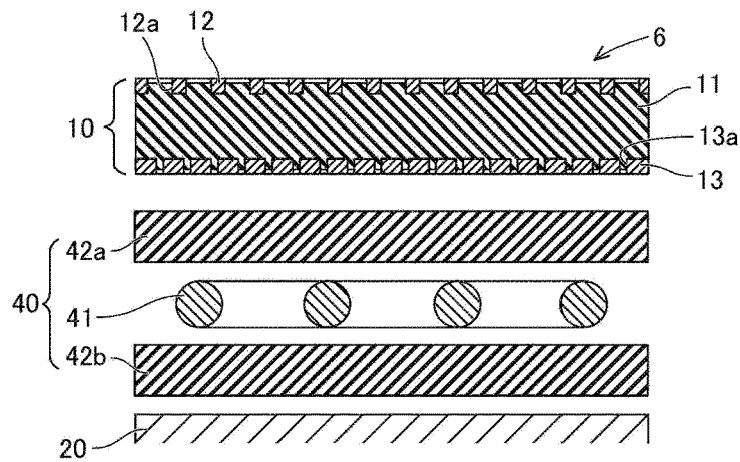
FIG. 12 is a diagram showing a method of manufacturing the transducer of the sixth example.

A method of manufacturing the transducer 6 of the sixth example is described with reference to FIG. 12. A heater sheet laminated body in which a first material 42a of the heater insulating layer 42, a heater wire 41, and a second material 42b of the heater insulating layer 42 are laminated in this order is prepared (heater sheet preparing step).

Subsequently, the prepared heater sheet laminate is heated and pressed (heater sheet heating and pressing step). Then, each of the first material 42a and the second material 42b softens to function as the fusion material, and is fixed to the heater wire 41. Furthermore, the first material 42a is fixed and integrated with the second material 42b, thereby forming the heater insulating layer 42. In this way, the heater sheet 40 is formed.

Then, the electrostatic sheet 10 and the heater sheet 40 are prepared (preparation step). The front surface of the heater sheet 40 is heated (heater sheet heating step). Then, the back surface side of the electrostatic sheet 10 is brought into contact with the front surface side of the heater sheet 40, and the electrostatic sheet 10 and the heater sheet 40 are pressed (pressing step). Then, the front surface side of the heater insulating layer 42 softens to function as the fusion material, and the second electrode sheet 13 is fixed to the front surface side of the heater insulating layer 42. At the same time, the front surface side of the heater insulating layer 42 is also fixed to the exposed surface on the back surface side of the insulating sheet 11 of the electrostatic sheet 10.

Subsequently, the mounting surface of the substrate 20 is pressed against the back surface of the heater sheet 40 in a state that the back surface of the heater sheet 40 is heated and softened (heating and pressing step). Then, the mounting surface of the substrate 20 is fixed to the heater insulating layer 42 by fusion bonding of the heater insulating layer 42 itself. In this way, the transducer 6 is manufactured.

7-3. Effect of Transducer 6 of Sixth Example

The transducer 6 has the heater function, and thus can impart heat to the target person in addition to detecting the state of the target person and imparting a vibration to the target person. In particular, by setting the thermal conductivity of the insulating sheet 11 and the heater insulating layer 42 as described above, the heat of the heater wire 41 can be transferred to the front surface of the electrostatic sheet 10. In addition, the insulating sheet 11 and the heater insulating layer 42 have the flame-retardant filler, and thereby the heat resistance effect can be improved.

In addition, the heater wire 41 may become a noise generation source due to the power supply to the heater wire 41. However, an aperture ratio of the plurality of second through holes 13a of the second electrode sheet 13 is smaller than an aperture ratio of the plurality of first through holes 12a of the first electrode sheet 12. Therefore, the second electrode sheet 13 exhibits a high shielding function for the heater wire 41. That is, the second electrode sheet 13 can exhibit the shielding function even if noise is generated due to the power supplied to the heater wire 41. As a result, the transducer 6 can achieve a satisfactory detection precision as a sensor or a satisfactory operation precision as an actuator.

8. Application Target of Electrostatic Transducer Unit

An electrostatic transducer unit (hereinafter, referred to as "transducer unit") is a member having a center line. The member having a center line includes a member having a straight center line (rod shape), a member having a curved center line, and the like. The cross section (cross section perpendicular to the axis) of the member can be any shape such as a circle, an ellipse, a polygon, and the like. In addition, the member includes a member having two ends, an endless member such as a ring-shaped member or a frame-shaped member, and the like. For example, the member having two ends may be a joystick, an armrest, a door knob, a shift lever, a door trim, a center trim, or the like. In addition, the grip portion of the steering wheel is an example of the endless member. Moreover, when the grip portion of the steering wheel has, for example, an arcuate shape such as a C shape or the like, it can be regarded as an example of the member having two ends.

9. Example of Transducer Unit 100

A steering wheel 200 is taken as an example of a transducer unit 100 and is described with reference to FIG. 13. For example, a steering wheel with a sensor function, which can detect contact of a driver's hand, is taken as an example of the steering wheel 200. Moreover, the steering wheel 200 may have an actuator function which imparts vibration or the like to the driver's hand.

Figure 13:
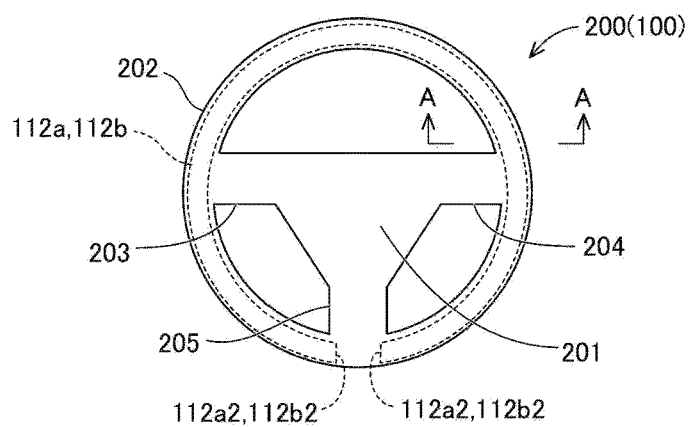
FIG. 13 is a front view of a steering wheel serving as a transducer unit of the first example.

As shown in FIG. 13, the steering wheel 200 includes a core portion 201 located at the center, a ring-shaped grip portion 202, and a plurality of connecting portions 203, 204 and 205 connecting the core portion 201 and the grip portion 202. The grip portion 202 is a portion gripped by the driver during steering operation. The grip portion 202 has a sensor function for detecting contact with the driver's hand.

Here, in this example, the grip portion 202 has a sensor function over substantially the entire circumference. For example, the grip portion 202 can detect contact in each of the two regions including the front surface and the back surface. That is, the grip portion 202 includes a transducer 112a arranged on the front surface and a transducer 112b arranged on the back surface.

10. Transducer Unit 110 of First Example

The configuration of a transducer unit 110 of a first example is described with reference to FIG. 13 and FIG. 14.

In particular, as an example of the transducer unit 110, a detailed configuration of the grip portion 202 of the steering wheel 200 is described.

The grip portion 202 of the steering wheel 200 includes a core material 111 having a center line, transducers 112a and 112b, a resin inner layer material 113, and an outer coating material 114. The front shape of the core material 111 is, for example, a ring shape. That is, the core material 111 is a member having a ring-shaped center line. The core 111 is formed of, for example, a conductive metal such as aluminum and the like. Besides, the core material 111 is connected to, for example, ground potential. The core material 111 is connected to the connecting portions 203, 204 and 205 shown in FIG. 13. A case in which the shape of a cross-section perpendicular to the axis of the core material 111 is formed, for example, in a U shape is taken as an example. However, the shape of the cross-section perpendicular to the axis of the core material 111 can be any shape such as a circle, an ellipse, a polygon, and the like. Moreover, the core material 111 may also be made of a non-conductive resin.

Any one of the transducers 1, 2, 3, 4 and 5 can be used as the transducers 112a and 112b. In FIG. 14, the transducer 112a on the front surface is arranged on the upper side of the figure, and the transducer 112b on the rear surface is arranged on the lower side of the figure. In FIG. 14, the transducers 112a and 112b are shown to include the insulating sheet 11, the first electrode sheet 12, and the second electrode sheet 13. For example, the first electrode sheet 12 functions as a sensor electrode, and the second electrode sheet 13 functions as a shield electrode.

The transducers 112a and 112b are arranged opposite to the outer surface of the core material 111 with a space therebetween. That is, as shown in FIG. 14, the transducers 112a and 112b are arranged along the outer peripheral surface of the core material 111 so as to face the outer peripheral surface of the core material 111 centering on the center line. In addition, the transducers 112a and 112b are arranged along the ring-shaped circling direction of the core material 111.

Here, the second electrode sheet 13 forming the transducers 112a and 112b is arranged on the core material 111 side. That is, the back surface of the second electrode sheet 13 is arranged along the outer peripheral surface of the core material 111 and the circling direction of the core material 111 so as to face the outer peripheral surface of the core material 111 centering on the center line. That is, the back surface of the second electrode sheet 13 forms the back surfaces of the transducers 112 and 112b.

Figure 14:
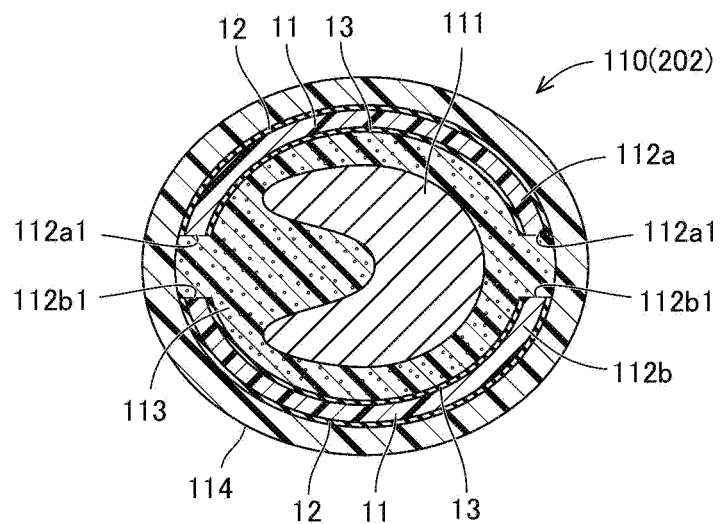
FIG. 14 is an enlarged sectional view taken along line A-A of FIG. 13.

Here, as shown in FIG. 14, in the transducers 112a and 112b, the end sides in the circumferential direction of the outer peripheral surface of the core material 111 are defined as first end sides 112a1 and 112b1. In addition, as shown in FIG. 13, in the transducers 112a and 112b, the end sides in the ring-shaped circling direction of the core material 111 are defined as second end sides 112a2 and 112b2.

The two first end sides 112a1 and 112b1 of the transducers 112a and 112b are arranged opposite to each other with a space therebetween in the circumferential direction of the outer peripheral surface of the core material 111. For example, in FIG. 14, the first end side 112a1 of the transducer 112a and the first end side 112b1 of the transducer 112b are arranged opposite to each other with a space therebetween in the circumferential direction of the outer peripheral surface of the core material 111.

In addition, the two second end sides 112a2 and 112b2 of the transducers 112a and 112b are arranged opposite to each other with a space therebetween in the ring-shaped circling direction of the core material 111. For example, in FIG. 13, the second end side 112a2 of the transducer 112a and the second end side 112b2 of the transducer 112b are arranged opposite to each other with a space therebetween in the ring-shaped circling direction of the core material 111.

The resin inner layer material 113 is interposed between the outer peripheral surface of the core material 111 and the back surfaces of the transducers 112a and 112b, and is fixed to the core material 111 and the transducers 112a and 112b. The resin inner layer material 113 is formed by injection molding. By using the core material 111 and the transducers 112a and 112b as mold inserts, the resin inner layer material 113 is fixed to the core material 111 and the transducers 112a and 112b at the time of completion of injection molding. The resin inner layer material 113 is formed of, for example, a foamed resin such as urethane foam. Moreover, the resin inner layer material 113 may also be a non-foamed resin.

Furthermore, the resin inner layer material 113 is interposed in a space between the two opposing first end sides 112a1 and 112b1 in the circumferential direction of the outer peripheral surface of the core material 111. In addition, the resin inner layer material 113 is interposed in a space between the two opposing second end sides 112a2 and 112b2 in the ring-shaped circling direction of the core material 111.

The outer coating material 114 covers the surfaces of the transducers 112a and 112b. The outer coating material 114 may be formed by injection molding using resin, or may be formed using leather.

When the transducers 112a and 112b are arranged along the outer peripheral surface of the core material 111, the resin inner layer material 113 is arranged between the outer peripheral surface of the core material 111 and the back surfaces of the transducers 112a and 112b, and the resin inner layer material 113 is fixed to the outer peripheral surface of the core material 111 and the back surfaces of the transducers 112a and 112b. Thus, the transducers 112a and 112b can be prevented from peeling off from the core material 111.

Furthermore, by interposing the resin inner layer material 113 in the space between the two opposing end sides (the first end sides and the second end sides) in the transducers 112a and 112b, the design property of the transducer unit 110 is improved. In addition, by applying the resin inner layer material 113, the transducer unit 110 can be easily manufactured.

Here, when the transducers 112a and 112b include the heater sheet 40 like the transducer 6 of the sixth example described above, the resin inner layer material 113 is fixed to the heater sheet 40.

11. Transducer Unit 120 of Second Example

The configuration of a transducer unit 120 of a second example is described with reference to FIGS. 15 and 16. As an example of the transducer unit 120, a detailed configuration of the grip portion 202 of the steering wheel 200 is described as in the first example. In addition, in the transducer unit 120 of the second example, the same components as those in the first example are designated by the same reference signs and the description thereof is omitted.

Figure 15:
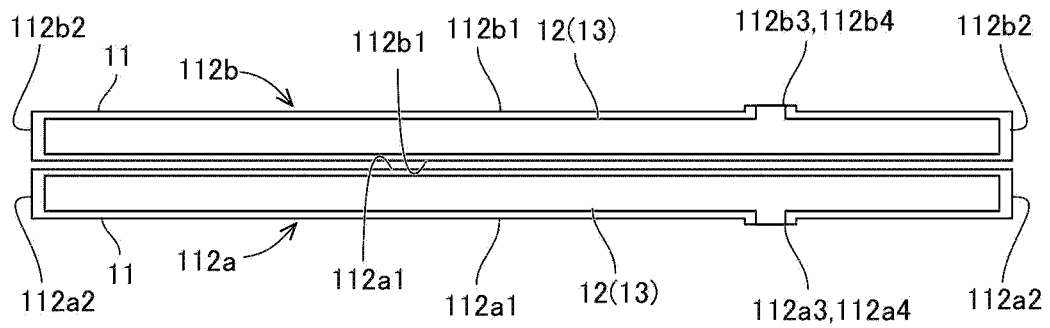
FIG. 15 is a diagram showing a transducer applied to a transducer unit of the second example.

As shown in FIG. 15, the transducers 112a and 112b include first terminal portions 112a3 and 112b3 which are electrically connected to the first electrode sheet 12. The first terminal portions 112a3 and 112b3 are formed in the same manner as the first electrode sheet 12, and project from the long side of the first electrode sheet 12.

In addition, as shown in FIG. 15, the transducers 112a and 112b include second terminal portions 112a4 and 112b4 which are electrically connected to the second electrode sheet 13. The second terminal portions 112a4 and 112b4 are formed in the same manner as the second electrode sheet 13, and project from the long side of the second electrode sheet 13.

Figure 16:
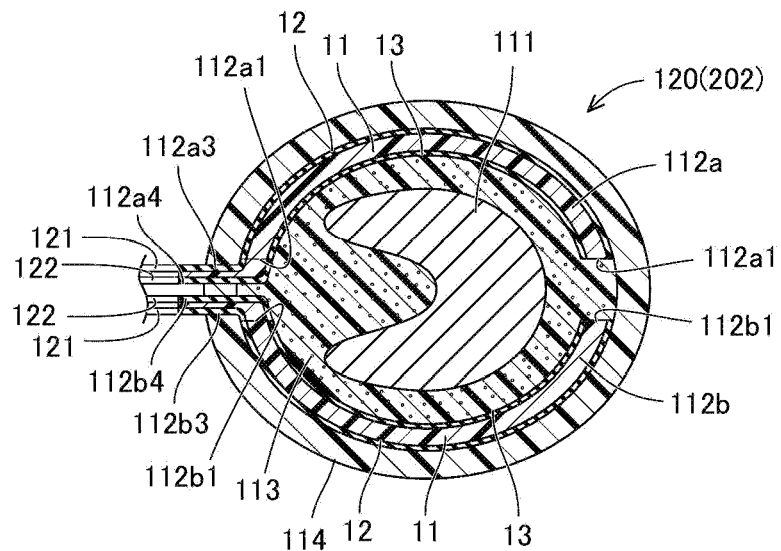
FIG. 16 is an enlarged sectional view of the transducer unit of the second example taken along line A-A of FIG. 13.

As shown in FIG. 16, at least a part of the first terminal portions 112a3 and 112b3 and at least a part of the second terminal portions 112a4 and 112b4 are arranged in a space between the opposing first end sides 112a1 and 112b1. Besides, the ends of the first terminal portions 112a3 and 112b3 and the ends of the second terminal portions 112a4 and 112b4 extend outward beyond the outer coating material 114 and are electrically connected to the first wire 121 and the second wire 122. Moreover, the first wire 121 and the second wire 122 extend to, for example, the vicinity of the core portion 201 of the steering wheel 200, and are connected to a detection circuit (not shown).

That is, by arranging at least a part of the first terminal portions 112a3 and 112b3 and at least a part of the second terminal portions 112a4 and 112b4 in the space between the opposing first end sides 112a1 and 112b1, the design property can be satisfactory.

In addition, at least a part of the first terminal portions 112a3 and 112b3 and at least a part of the second terminal portions 112a4 and 112b4 can also be arranged in a space between the opposing second end sides 112a2 and 112a2, instead of the space between the first end sides 112a1 and 112b1.

12. Transducer Unit 130 of Third Example

The configuration of a transducer unit 130 of a third example is described with reference to FIG. 17. As an example of the transducer unit 130, a detailed configuration of the grip portion 202 of the steering wheel 200 is described as in the second example. In addition, in the transducer unit 130 of the third example, the same components as those in the second example are designated by the same reference signs and the description thereof is omitted.

Figure 17:
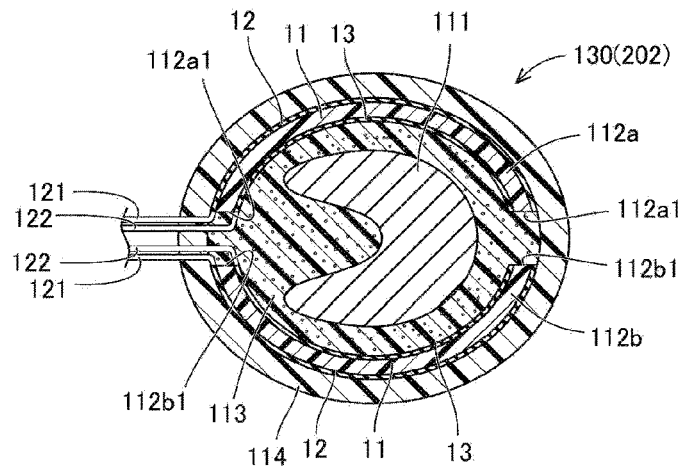
FIG. 17 is an enlarged sectional view of a transducer unit of the third example taken along line A-A of FIG. 13.
Figure 18:
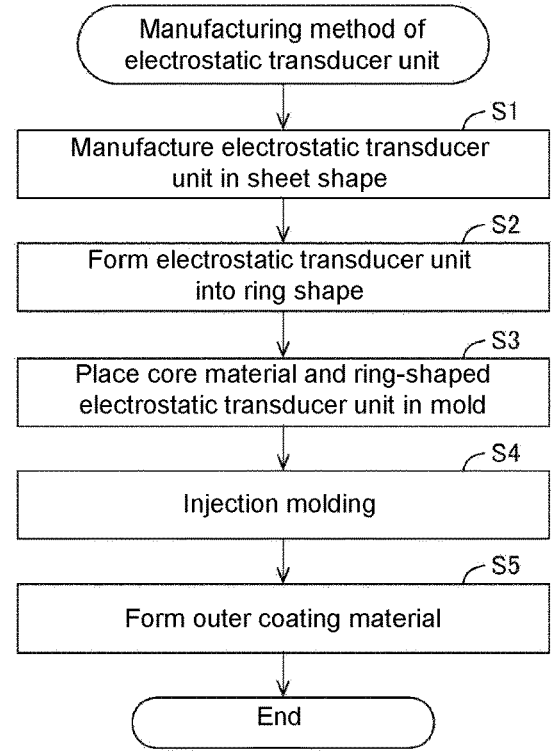
FIG. 18 is a flowchart showing a method of manufacturing a transducer unit of the fourth example.

As shown in FIG. 17, the transducers 112a and 112b include the first wire 121 electrically connected to the first electrode sheet 12. For example, one end of the first wire 121 is connected to the long side of the first electrode sheet 12. In addition, the transducers 112a and 112b include the second wire 122 electrically connected to the second electrode sheet 13. One end of the second wire 122 is connected to the long side of the second electrode sheet 13.

As shown in FIG. 17, at least a part of the first wire 121 and at least a part of the second wire 122 are arranged in the space between the opposing first end sides 112a1 and 112b1. Besides, the other end of the first wire 121 and the other end of the second wire 122 extend outward beyond the outer coating material 114, for example, to the vicinity of the core portion 201 of the steering wheel 200, and are connected to a detection circuit (not shown). That is, by arranging at least a part of the first wire 121 and at least a part of the second wire 122 in the space between the opposing first end sides 112a1 and 112b1, the design property can be satisfactory.

In addition, at least a part of the first wire 121 and at least a part of the second wire 122 can also be arranged in the space between the opposing second end sides 112a2 and 112b2, instead of the space between the first end sides 112a1 and 112b1.

13. Transducer Unit 140 of Fourth Example and Manufacturing Method

The configuration and manufacturing method of a transducer unit 140 of a fourth example is described with reference to FIGS. 18 to 25. As an example of the transducer unit 130, a detailed configuration of the grip portion 202 of the steering wheel 200 is described as in the second example. In addition, in the transducer unit 130 of the third example, the same components as those in the second example are designated by the same reference signs and the description thereof is omitted.

Figure 19:
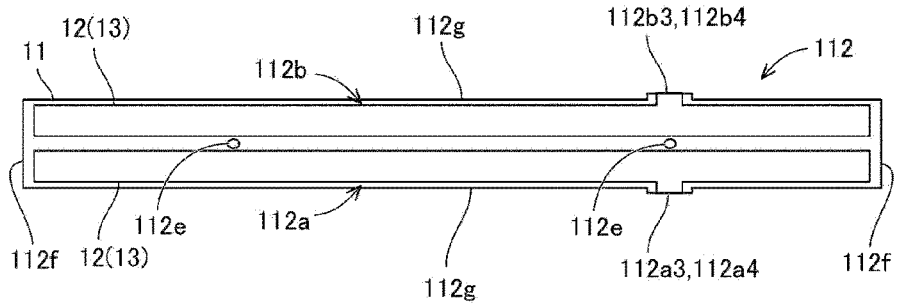
FIG. 19 is a diagram showing a transducer applied to the transducer unit of the fourth example.

The transducer 112 shown in FIG. 19 is formed into a sheet shape (step S1). The transducer 112 is a sheet in which the two transducers 112a and 112b shown in FIG. 15 are integrated. That is, the portions of the insulating sheet 11 of the two transducers 112a and 112b are integrated. In addition, the transducer 112 has the first terminal portions 112a3 and 112b3 and the second terminal portions 112a4 and 112b4. The sheet-shaped transducer 112 has a first end side 112f being a short side and a second end side 112g being a long side.

Furthermore, the transducer 112 has, in a region where the first electrode sheet 12 and the second electrode sheet 13 are not arranged, third through holes 112e penetrating in the thickness direction. In this example, two third through holes 112e are formed between the transducers 112a and 112b.

Figure 20:
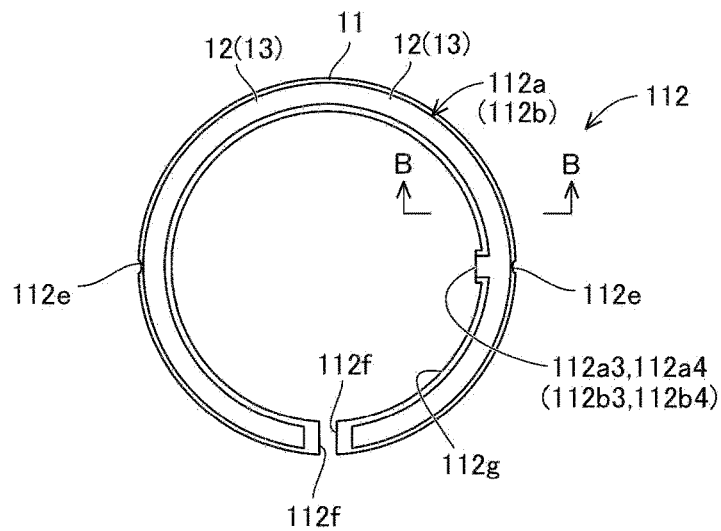
FIG. 20 is a front view of a preformed transducer.

Subsequently, as shown in FIG. 20, the sheet-shaped transducer 112 is preformed into a cylindrical ring shape (step S2). The two first end sides 112f of the preformed transducer 112 are formed opposite to each other in the ring-shaped circling direction. In FIG. 20, opposing portions are located on the lower side.

Figure 21:
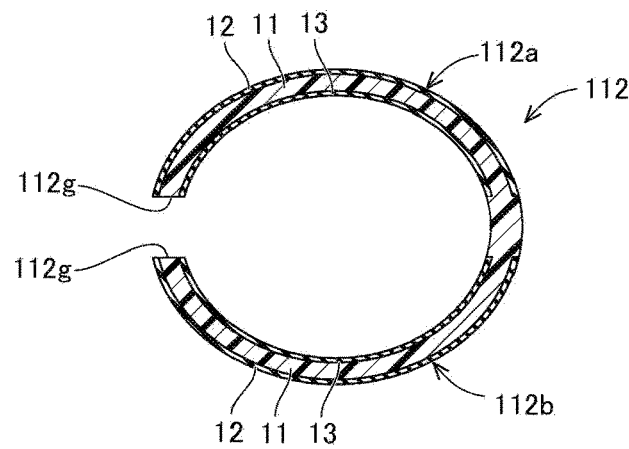
FIG. 21 is an enlarged sectional view taken along line B-B of FIG. 20.

Furthermore, as shown in FIG. 21, two second end sides 112g of the preformed transducer 112 are formed opposite to each other on the outer peripheral surface centering on the cylindrical center line. As shown in FIG. 20 and FIG. 21, the two opposing second end sides 112g are located on the side facing the ring-shaped center.

Figure 22:
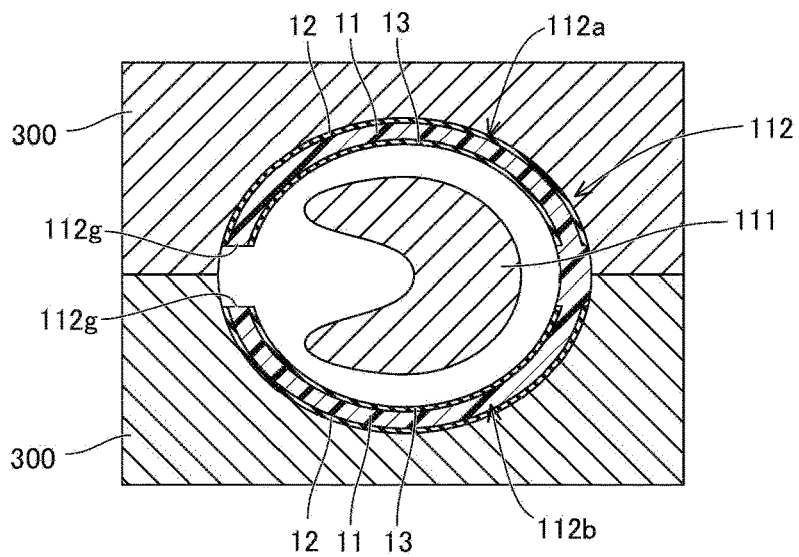
FIG. 22 is a sectional view before injection molding.
Figure 23:
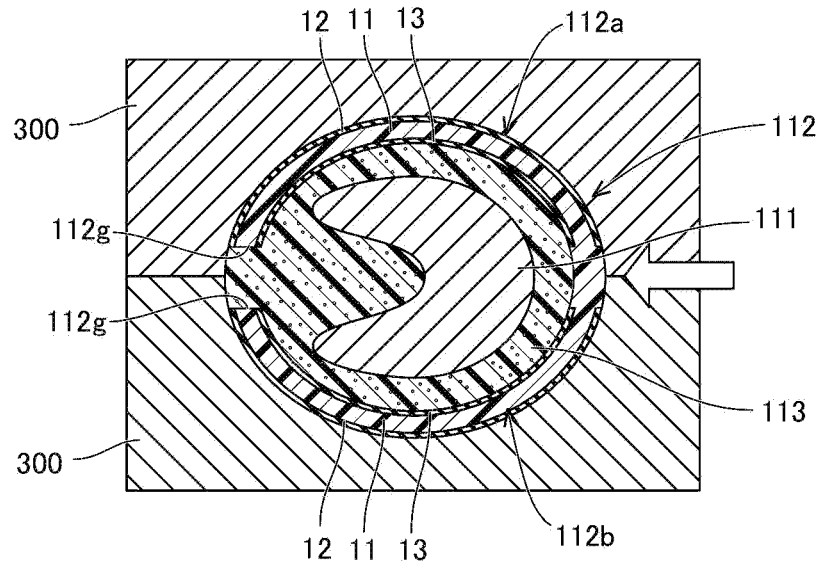
FIG. 23 is a sectional view after injection molding.

Subsequently, as shown in FIG. 22, the core material 111 and the transducer 112 preformed in a ring shape are placed in a mold 300 (step S3). Then, as shown in FIG. 22, the resin inner layer material 113 is formed by injection molding (step S4). At this time, the third through holes 112e function as a resin injection hole for injection molding, and the space between the opposing first end sides 112f or the space between the opposing second end side 112g functions as an air vent hole during resin injection. In addition, the space between the opposing first end sides 112f or the space between the opposing second end sides 112g may also function as the resin injection hole for injection molding, and the third through holes 112e may also function as the air vent hole during resin injection. Besides, the resin inner layer material 113 is arranged in the space between the opposing first end sides 112f, the space between the opposing second end sides 112g, and the third through holes 112e.

Figure 24:
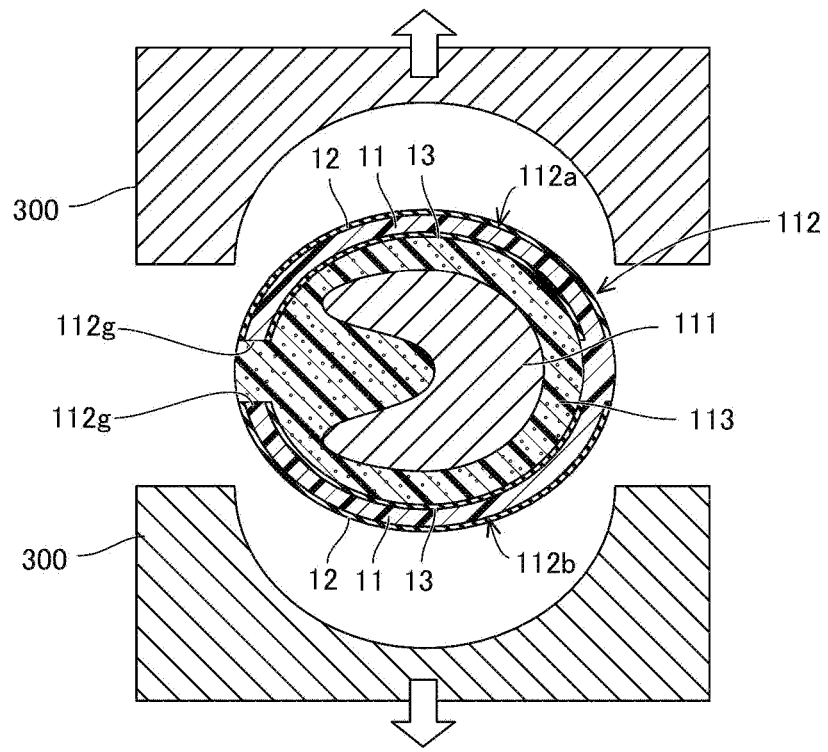
FIG. 24 is a sectional view of a state in which a mold is separated after injection molding.
Figure 25:
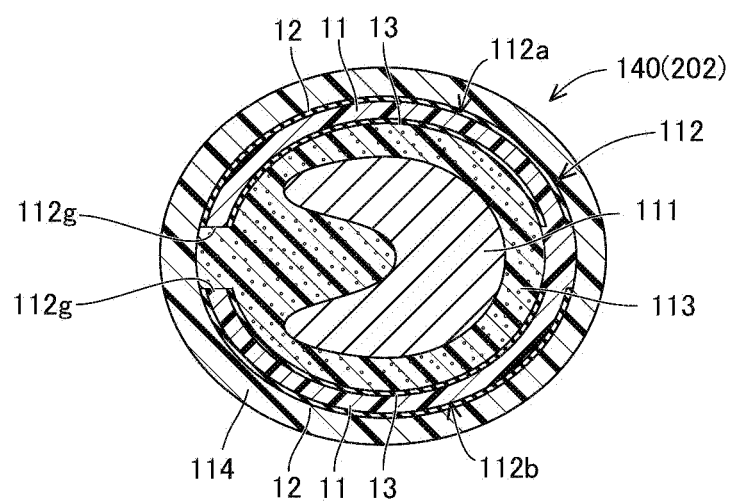
FIG. 25 is an enlarged sectional view of the transducer unit of the fourth example taken along line A-A of FIG. 13.

Then, as shown in FIG. 24, the core material 111, the transducer 112, and the resin inner layer material 113 are molded by removing the mold 300. Subsequently, as shown in FIG. 25, the outer coating material 114 is formed by injection molding or the like (step S5). In this way, the steering wheel 200 serving as the transducer unit 140 is completed. The transducer unit 140 manufactured as above is easy to manufacture and has a satisfactory design property.

Here, in the above description, the first terminal portions 112a3 to 112d3 and the second terminal portions 112a4 to 112d4 are arranged in the space between the opposing second end sides 112g. However, in addition to this, the first terminal portions 112a3 to 112d3 and the second terminal portions 112a4 to 112d4 may also be arranged in the space between the opposing first end sides 112f. Furthermore, the first terminal portions 112a3 to 112d3 and the second terminal portions 112a4 to 112d4 may also be arranged in the third through holes 112e.

In addition, as shown in FIG. 17, when the transducer 112 does not have the first terminal portions 112a3 to 112d3 and the second terminal portions 112a4 to 112d4 but has the first wire 121 and the second wire 122, the first wire 121 and the second wire 122 may be arranged in the space between the opposing second end sides 112g. In addition, the first wire 121 and the second wire 122 may also be arranged in the space between the opposing first end sides 112f. Alternatively, the first wire 121 and the second wire 122 may also be arranged in the third through holes 112e.

14. Others

In the transducer units 110, 120, 130 and 140 of the first example to the fourth example, the transducer 112a is arranged on the front surface and the transducer 112b is arranged on the back surface. However, a plurality of transducers may be arranged on one or both of the front surface and the back surface.

In this case, the resin inner layer material can be interposed in the space between the second end sides of the adjacent transducers arranged to face each other in the ring-shaped circling direction. In this case, each of the plurality of transducers may be provided with the first terminal portions and the second terminal portions at an intermediate position in the ring-shaped circling direction. In addition, the plurality of transducers may also be provided with the first terminal portions and the second terminal portions on the respective opposing second end sides in the ring-shaped circling direction.

Besides, in the transducer units 110, 120, 130 and 140 of the first example to the fourth example, the following transducers can also be used instead of the transducers 1 to 6 in the first example to the sixth example. The transducer to be applied is, for example, a transducer provided with the first electrode sheet 12 and the second electrode sheet 13 in which the through holes 12a and 13a have the same aperture ratio and aperture area, a transducer provided with the first electrode sheet 12 and the second electrode sheet 13 which have no through holes 12a and 13a, or the like. In the transducer to be applied, the configurations other than the first electrode sheet 12 and the second electrode sheet 13 are the same.

What is claimed is:

1. An electrostatic transducer comprising:
   an insulating sheet,
   a first electrode sheet arranged on a front surface side of the insulating sheet and having a plurality of first through holes penetrating in a thickness direction, and
   a second electrode sheet arranged on a back surface side of the insulating sheet, having a plurality of second through holes in the thickness direction and functioning as a shield electrode, wherein an aperture ratio of the plurality of second through holes is smaller than an aperture ratio of the plurality of first through holes.

2. The electrostatic transducer according to claim 1, wherein an aperture area of each of the second through holes is smaller than an aperture area of each of the first through holes.

3. The electrostatic transducer according to claim 1, wherein a diameter of an inscribed circle of the first through hole is set to 150 μm or more and 15 mm or less.

4. The electrostatic transducer according to claim 1, wherein the aperture ratio of the plurality of first through holes is 30% or more.

5. The electrostatic transducer according to claim 1, wherein the first electrode sheet has at least two detection regions, and the at least two detection regions each have the first through holes having different aperture areas.

6. The electrostatic transducer according to claim 1, wherein the first electrode sheet has at least two detection regions, and the at least two detection regions have different thicknesses.

7. The electrostatic transducer according to claim 1, wherein the insulating sheet is formed of an elastomer, and
the first electrode sheet and the second electrode sheet are fixed to the insulating sheet by fusion bonding of the insulating sheet itself.

8. The electrostatic transducer according to claim 7, wherein the first electrode sheet and the second electrode sheet are embedded in the insulating sheet.

9. The electrostatic transducer according to claim 7, wherein the first electrode sheet and the second electrode sheet are formed of an elastomer containing a conductive filler.

10. An electrostatic transducer comprising:
an insulating sheet,
a first electrode sheet arranged on a front surface side of the insulating sheet and having a plurality of first through holes penetrating in a thickness direction, and
a second electrode sheet arranged on a back surface side of the insulating sheet, and having no through holes or having a plurality of second through holes in the thickness direction, wherein an aperture ratio of the plurality of second through holes is smaller than an aperture ratio of the plurality of first through holes,
wherein the insulating sheet is formed of an elastomer,
the first electrode sheet and the second electrode sheet are fixed to the insulating sheet by fusion bonding of the insulating sheet itself,
the first electrode sheet and the second electrode sheet are embedded in the insulating sheet,
at least a part of the first electrode sheet is embedded in the insulating sheet,
the insulating sheet comprises a first coating layer formed by a part of the insulating sheet on a front surface side of the first electrode sheet, and
at least a part of a front surface of the first electrode sheet is fixed to the first coating layer by fusion bonding of the first coating layer itself.

11. An electrostatic transducer comprising:
an insulating sheet,
a first electrode sheet arranged on a front surface side of the insulating sheet and having a plurality of first through holes penetrating in a thickness direction, and
a second electrode sheet arranged on a back surface side of the insulating sheet, and having a plurality of second through holes in the thickness direction and functioning as a shield electrode, wherein an aperture ratio of the plurality of second through holes is smaller than an aperture ratio of the plurality of first through holes,
wherein the insulating sheet is formed of a styrene elastomer or an olefin elastomer.

12. The electrostatic transducer according to claim 11, wherein the first electrode sheet is formed of a styrene elastomer or an olefin elastomer, and a softening point of the first electrode sheet is higher than a softening point of the insulating sheet.

13. An electrostatic transducer comprising:
an insulating sheet,
a first electrode sheet arranged on a front surface side of the insulating sheet and having a plurality of first through holes penetrating in a thickness direction,
a second electrode sheet arranged on a back surface side of the insulating sheet, and having a plurality of second through holes in the thickness direction and functioning as a shield electrode, wherein an aperture ratio of the plurality of second through holes is smaller than an aperture ratio of the plurality of first through holes, and
a heater sheet laminated on a back surface side of the second electrode sheet.

14. The electrostatic transducer according to claim 13, wherein the insulating sheet has a thermal conductivity of 0.3 W/m·K or more.

15. The electrostatic transducer according to claim 14, wherein the insulating sheet has a thermally conductive filler having a thermal conductivity of 5 W/m·K or more.

16. The electrostatic transducer according to claim 15, wherein the thermally conductive filler is an insulating metal filler.

17. The electrostatic transducer according to claim 13, wherein the insulating sheet has a flame-retardant filler.

18. The electrostatic transducer according to claim 17, wherein the flame-retardant filler is a hydroxide filler.

19. An electrostatic transducer unit comprising:
a core material having a center line,
an electrostatic transducer, comprising:
an insulating sheet,
a first electrode sheet arranged on a front surface side of the insulating sheet and having a plurality of first through holes penetrating in a thickness direction,
a second electrode sheet arranged on a back surface side of the insulating sheet, and having no through holes or having a plurality of second through holes in the thickness direction, wherein an aperture ratio of the plurality of second through holes is smaller than an aperture ratio of the plurality of first through holes,
wherein the electrostatic transducer is arranged along an outer peripheral surface of the core material so that the back surface of the second electrode sheet faces the outer peripheral surface of the core material centering on the center line, and
a resin inner layer material interposed between the outer peripheral surface of the core material and a back surface of the electrostatic transducer, and fixed to the core material and the electrostatic transducer,
wherein in the electrostatic transducer, end sides in a circumferential direction of the outer peripheral surface of the core material are defined as first end sides,
two first end sides of the electrostatic transducer are arranged opposite to each other with a space therebetween in the circumferential direction of the outer peripheral surface of the core material, and
the resin inner layer material is interposed in the space between the two first end sides.

20. The electrostatic transducer unit according to claim 19,
wherein the electrostatic transducer has a first terminal portion or a first wire electrically connected to the first electrode sheet, and
the first terminal portion or the first wire is arranged in the space between the two opposing first end sides.

21. The electrostatic transducer unit according to claim 19,
wherein the electrostatic transducer has, in a region where the first electrode sheet and the second electrode sheet are not arranged, at least one third through hole penetrating in the thickness direction and functioning as a resin injection hole or an air vent hole at the time of resin injection, and
the resin inner layer material is arranged in the third through hole.

22. The electrostatic transducer unit according to claim 21,
wherein the electrostatic transducer has a first terminal portion or a first wire electrically connected to the first electrode sheet, and
the first terminal portion or the first wire is arranged in the third through hole.

23. The electrostatic transducer unit according to claim 19,
wherein the core material has a shape in which the center line is formed in a ring shape,
in the electrostatic transducer, end sides in a ring shaped circling direction of the core material are defined as second end sides,
two second end sides of the electrostatic transducer are arranged opposite to each other with a space therebetween in the ring shaped circling direction of the core material, and
the resin inner layer material is interposed in the space between the two second end sides.

24. The electrostatic transducer unit according to claim 23,
wherein the electrostatic transducer has a first terminal portion or a first wire electrically connected to the first electrode sheet, and
the first terminal portion or the first wire is arranged in the space between the two opposing second end sides.

25. The electrostatic transducer unit according to claim 19,
wherein the electrostatic transducer further comprises a heater sheet arranged on the back surface side of the second electrode sheet, and
the resin inner layer material is fixed to the heater sheet.

26. The electrostatic transducer unit according to claim 19,
wherein the electrostatic transducer has a second terminal portion or a second wire electrically connected to the second electrode sheet, and
the second terminal portion or the second wire is arranged in the space between the two opposing first end sides.

* * * * *